Jan. 3, 1928.
R. G. HAUSDORFER
1,655,225
SHOCK ABSORBER
Filed May 10, 1926
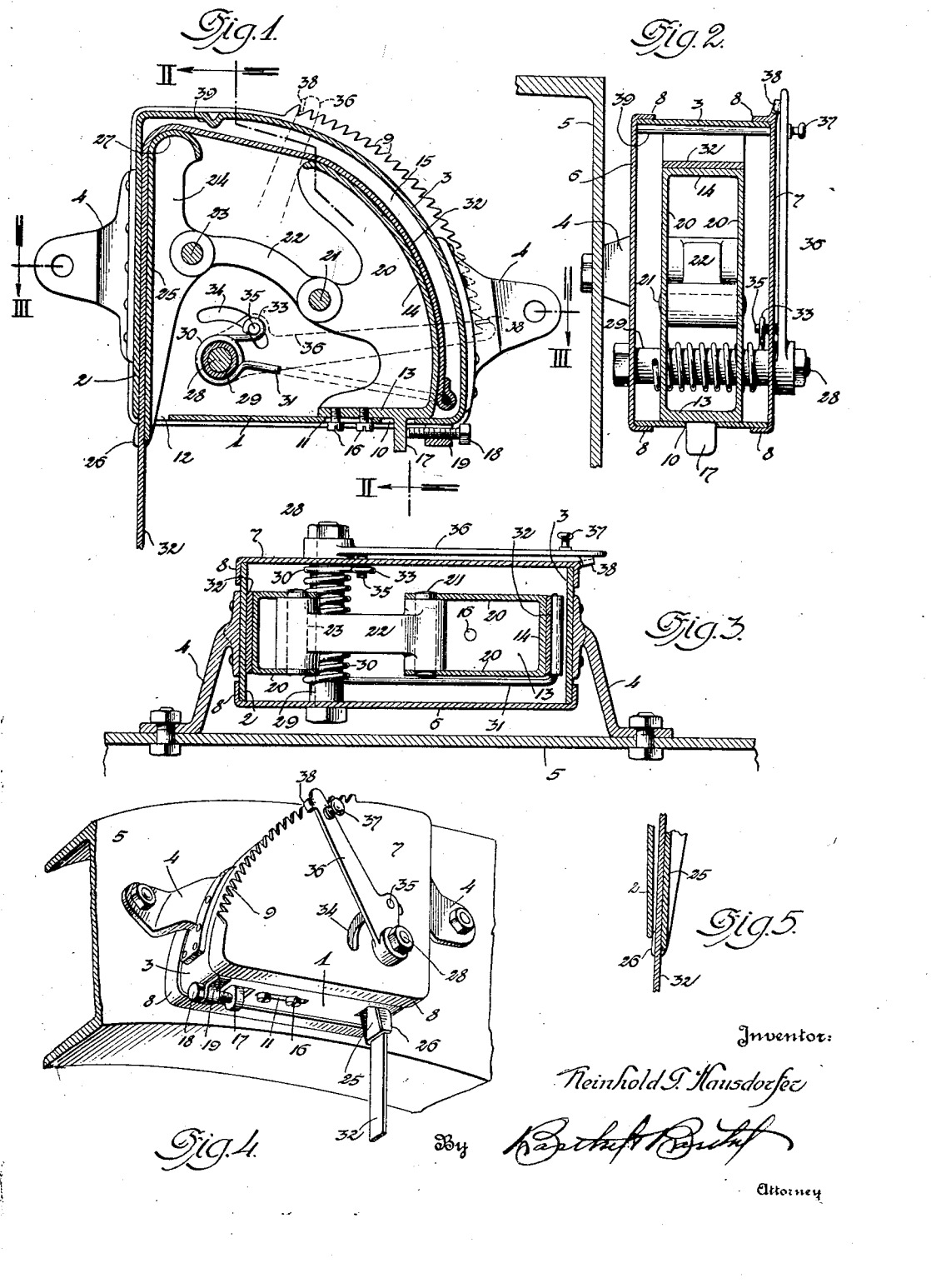
Inventor:
Reinhold G. Hausdorfer
By
Attorney Patented Jan. 3, 1928.

1,655,225

UNITED STATES PATENT OFFICE.

REINHOLD G. HAUSDORFER, OF DETROIT, MICHIGAN.

SHOCK ABSORBER.

Application filed May 10, 1926. Serial No. 107,978.

This invention relates to a shock absorbing device that has been primarily designed for vehicles having spring supported bodies, the device being adapted to retard the recoil of a vehicle body, frame or chassis relative to axles, end trucks or the like, which recoil is incident to road shocks and body vibrations.

My invention has special reference to that class of shock absorbing devices wherein a flexible member connects two movable parts, as a vehicle axle and frame, and one end of the flexible member is provided with an automatic recoil resisting mechanism. In connection with this type of shock absorbing device, my invention aims to provide a simple, durable and inexpensive structure wherein a novel spring resists the movement of the flexible member, and provision is made to regulate the tension of the spring, prevent the flexible member from binding when assuming a normal position, permit of parts being adjusted and placed in proper working order, and permits of easy access being had to any of the parts for lubricating and repair purposes.

My invention will be hereinafter specifically described and then claimed, and reference will now be had to the drawing, wherein Figure 1 is a vertical longitudinal sectional view of the shock absorbing device;

Fig. 2 is a vertical cross sectional view taken on the line II—II of Fig. 1;

Fig. 3 is a horizontal sectional view of the device taken on the line III—III of Fig. 1;

Fig. 4 is a perspective view of the device, and

Fig. 5 is a detail sectional view of a portion of the device.

To put my invention into practice, I provide a substantially sector shaped casing shell having a bottom wall 1 and end wall 2 and a curved wall 3. The walls 2 and 3 may be formed or provided with suitable brackets 4 so that the casing shell may be supported from the vehicle frame 5, as shown in Fig. 4.

Fitted on the casing shell are side walls 6 and 7 having flanges 8 embracing the edges of the casing shell, and the flange 8 of the side wall 7 may be cut and stamped to provide a series of teeth or notches 9. Obviously these teeth or notches may be otherwise formed to provide an arcuated rack at the walls 7.

The bottom wall 1 of the casing shell is provided with three openings 10, 11 and 12. Mounted in the casing shell, on the bottom wall 1 over the openings 10 and 11 is the base portion 13 of an arcuated bracket 14 which confronts the curved wall 3 of the casing shell and cooperates therewith in providing a way 15, for a purpose that will hereinafter appear. The bracket 13 is held relative to the shell wall 1 by clamping screws 16 extending through the opening 11 into the base 13, which is provided with a lug 17 extending through the opening 10 for engagement with an adjusting screw 18. This screw is carried by a tapped bearing 19 attached to or struck out from the wall 1 of the shell casing. When the screws 16 are loose the screw 18 may be adjusted to shift the bracket base 13 longitudinally of the wall 1 to correctly position the bracket 14, which may be held by tightening the screws 16.

The bracket 14 is formed with parallel reinforcing webs 20 connected by a pivot pin 21 to a link 22, and said link supports a pivot pin 23 for the side ears or webs 24 of a brake shoe 25 confronting the end wall 2. The brake shoe 25 has side lugs 26 at its lower end engageable with the lower end of the end wall 2 when the brake shoe is tilted in one direction, and the upper end of said brake shoe is rounded, as at 27.

Connecting the side walls 6 and 7 of the casing is a nut equipped tie rod 28 provided with a spacer sleeve 29 between said walls. Encircling the spacer sleeve 29 is a coiled spring 30 which has one end thereof formed with an L-shaped arm 31 extending between the side wall 6 and the bracket 14 and between said bracket and the curved wall 3, where the end of said arm is connected to the inner end of a flexible member or strap 32 extending upwardly through the way 15 in engagement with the bracket 14, over the rounded end 27 of the brake shoe 25, downwardly between the end wall 2 and the brake shoe 25 and between the lugs 26, and attached to a vehicle axle or other member in proximity to the casing. Obviously the flexible member or strap 32 may be made of leather, metal or any suitable material for connecting the shock absorbing device to a vehicle part.

The opposite end of the coiled spring 30 has an eye 33 and extending into said eye, through a slot 34 of the wall 7, is a pin 35 carried by a lever 36 having its inner end loosely mounted on the tie rod 28. The outer end of the lever is provided with a handle 37 and a side extension or tooth 38 for engagement with the teeth or rack 9 of the casing wall 7. The lever 36 may have its outer end sprung sufficiently to permit of the tooth 38 disengaging the rack 9 and it is by virtue of this lever that the tension of the coiled spring 30 may be increased or decreased and held in its regulated condition. The retractile force of the spring 30 is adapted to hold the inner end of the flexible member 32 in proximity to the base 13 of the bracket 14, such being a normal or inactive position of the flexible member.

Assuming that the flexible member 32 is pulled out of the casing, incident to a recoil, said flexible member causes the brake shoe 24 to be bodily moved towards the end wall 2, causing a powerful frictional contact of the flexible member 32 against the wall 2, to resist outward movement of the flexible member. Cooperating with this frictional resistance is the spring 30 which has its arm 31 swung upwardly as the inner end of the flexible member 32 is moved over the arcuated bracket 14, which also offers some frictional resistance to the outward movement of the flexible member.

When the retractile force of the spring 30 returns the upper end of the flexible member 32 to its normal position, the brake shoe 24 is slightly raised and tilted whereby the lugs 26 engage the lower end of the wall 2 and prevent the brake shoe 25 from binding the flexible member 32 against the lower edge of the end wall 2. In other words, the flexible member 32 can readily shift through the opening 12, and to limit the upwardly tilting action of the brake shoe 24 there is an instruck portion or stop 39 on the wall 3 engageable by that portion of the flexible member 32 extending over the upper rounded end 27 of the brake shoe 25. This long brake shoe is in contradistinction to a roller or cylindrical member and it is by virtue of the flexible member bearing on the upper end of the shoe and throughout its length that the shoe is shifted for a braking action and tilted for a release action relative to the flexible member.

I attach considerable importance to the fact that the greater part of my shock absorbing device can be cut, stamped and pressed from sheet metal and the parts easily and quickly assembled and finished to harmonize with the finish of the vehicle. Furthermore, movement of the flexible member into the casing without binding or buckling, and regulation of the spring 30, are desirable features of my invention. It is thought that the operation and utility of the device will be apparent without further description, and while in the drawing there is illustrated a preferred embodiment of my invention, it is to be understood that the structural elements are susceptible to such variations and modifications as fall within the scope of the appended claims.

What I claim is—

1. A shock absorbing device comprising a casing having a flat wall, a flexible member extending into said casing parallel to the flat wall thereof and adapted to be pulled from said casing, a spring tension device in said casing to resist outward movement of said flexible member, and a movable brake shoe set in action by outward movement of said flexible member to cooperate with the flat wall of said casing in resisting outward movement of said flexible member.

2. A shock absorbing device as called for in claim 1, wherein said brake shoe is tiltable relative to the flat wall of said casing to afford clearance for said flexible member entering said casing.

3. A shock absorbing device as called for in claim 1, wherein said spring tension device including a helical spring with one end thereof extended at one side of said casing and connected to an end of said flexible member.

4. A shock absorbing device as called for in claim 1, wherein said spring tension device including a helical spring with one end thereof connected to an end of said flexible member, and a swingable latch lever to which the opposite end of said spring is connected and adapted to be adjusted relative to said casing.

5. In a shock absorbing device wherein a flexible member is movable in a casing to resist recoil;—a spring tension device in the casing for said flexible member, said spring tension device including a helical spring having one end thereof extending at one side of said casing and connected to said flexible member, and a lever swingable at the opposite side of said casing and connected to the opposite end of said spring for regulating the tension thereof.

6. In a shock absorbing device wherein a flexible member is movable in a casing to resist recoil;—a spring tension device including a coiled spring having one end thereof connected to said flexible member, a lever adjustable relative to said casing and connected to the opposite end of said spring for regulating the tension thereof, and an adjustable bracket in said casing serving as a guide for said flexible member.

7. A shock absorbing device as called for in claim 5, further characterized by a rack on said casing engageable by said lever to hold said spring at a desired tension.

8. A shock absorbing device comprising a casing, an adjustable bracket in said casing, a brake shoe pivotally supported from said bracket and adapted to cooperate with said casing as a brake, a flexible member extending into said casing between the casing wall and said brake shoe, a spring tension device in said casing connected to said flexible member, and means adapted for regulating said spring tension device from the exterior of said casing.

In testimony whereof I affix my signature.

REINHOLD G. HAUSDORFER.